(12) United States Patent
Harada

(10) Patent No.: US 8,031,934 B2
(45) Date of Patent: Oct. 4, 2011

(54) IMAGE PROCESSING APPARATUS AND COMPUTER-READABLE RECORDING MEDIUM WHICH RECORDS IMAGE PROCESSING PROGRAM

(75) Inventor: Hiroyuki Harada, Osaka (JP)

(73) Assignee: Kyocera Mita Corporation (JP)

( * ) Notice: Subject to any disclaimer, the term of this patent is extended or adjusted under 35 U.S.C. 154(b) by 888 days.

(21) Appl. No.: 12/039,800

(22) Filed: Feb. 29, 2008

(65) Prior Publication Data

US 2008/0232684 A1    Sep. 25, 2008

(30) Foreign Application Priority Data

Mar. 19, 2007   (JP) ................................ 2007-071203

(51) Int. Cl.
*G06K 9/00* (2006.01)
(52) U.S. Cl. ...................................................... 382/162
(58) Field of Classification Search .......... 382/162–165, 382/167; 345/589–597; 358/1.9, 2.1, 518–522
See application file for complete search history.

(56) References Cited

U.S. PATENT DOCUMENTS 6,771,813 B1 * 8/2004 Katsuyama ................... 382/165
6,891,641 B1 * 5/2005 Kouzaki ....................... 358/3.05
7,127,115 B2 * 10/2006 Osawa et al. ................. 382/239

FOREIGN PATENT DOCUMENTS

JP          2002-77633        3/2002

* cited by examiner

*Primary Examiner* — Jose Couso
(74) *Attorney, Agent, or Firm* — Gerald E. Hespos; Michael J. Porco

(57) ABSTRACT

An image processer has an extractor to extract a character area from color image data. A color-difference-value acquirer acquires information about color-difference values in the character area. A color-saturation-value acquirer acquires information about color saturation in the character area. A color-difference-subrange storage stores pre-defined color-difference subranges. A chromatic-region determination section determines the character area as gray when color salutation values fail to satisfy a condition for a chromatic color, and determines the character area as a chromatic region when color saturation values in the character area satisfy the condition. A first color-difference-subrange assignment section assigns a stored color-difference subrange to the character area determined as the chromatic region based on information about color-difference values. A representative-color setup section sets color information about the character area determined as chromatic by using an average of the color-difference values in the color-difference subrange assigned to the character area.

8 Claims, 11 Drawing Sheets

IMAGE PROCESSING APPARATUS AND COMPUTER-READABLE RECORDING MEDIUM WHICH RECORDS IMAGE PROCESSING PROGRAM

BACKGROUND OF THE INVENTION

1. Field of the Invention

The present invention relates to an image processing apparatus for subjecting color image data including a character to an image processing, and a computer-readable recording medium which records a program for performing the image processing.

2. Description of the Related Art

In recent years, it has become so popular to use a scanner apparatus designed to read a color image from a document so as to create an electronic file containing data about the color image, and transmit the electronic file to an external terminal unit, such as a personal computer, which is connected to the scanner apparatus via a network or a communication interface, and a complex machine having such a scanner function and a copy function.

With a view to reduction in communication load and in storage space required for storing image data in the form of an electronic file, the scanner apparatus or the complex machine is designed to compress color image data read from a document so as to reduce a file size. As a methodology for efficiently compressing image data, there has been known an irreversible compression (i.e., glossy compression) scheme suitable for compression of a multivalued image, such as a JPEG (Joint Photographic Experts Group) scheme, which is configured to irreversibly compress image data while keeping deterioration in image quality at an invisible level by taking advantage of human's visual characteristics, so as to perform high-efficiency data compression.

In an operation of compressing image data consisting of a mixture of a character and a background image, using the irreversible compression scheme, there is a problem that severe deterioration in image quality occurs in an area having a high contract, such as a character area, to cause a decline in visibility of the character. In order to improve the problem about poor visibility of a character mixed with a multivalued image, the following technique has been known.

In this conventional technique, only a character area is extracted from a color image read from a document, and formed as monochrome (i.e., achromatic) binarized image data. The obtained binarized image data is compressed using an reversible compression scheme suitable for compression of binarized data, such as an MMR (Modified Relative Element Address Designate) scheme. In addition, information about a specific color exhibiting a peak in a color histogram of the character area is acquired as color information of the character area. Image data about the remaining area other than the character area is compressed using the high-efficiency irreversible compression scheme.

That is, the above conventional technique is designed to compress image data about a character area and image data about a non-character area individually, and additionally acquire color information of the character area, so as to reduce a data volume without a decline in visibility of the character area (see, for example, JP 2002-77633A). There has also been known a file format, such as a high-compression PDF (Portable Document Format) or an XPS (XML Paper Specification) format, which is capable of combining the image data/color information of the character area and the image data about the remaining area other than the character area, and creating a single electronic file containing the combined data.

However, in cases where a specific color exhibiting a peak in a color histogram of a character area is used as a representative color of the character area as mentioned above, color reproducibility of a color character will deteriorate. This causes a problem that a delicate difference in hue cannot be rendered, for example, in a color image where a vermilion seal is stamped beside a red character.

SUMMARY OF THE INVENTION

It is an object of the present invention to provide an image processing apparatus capable of acquiring a representative color of a character area in such a manner as to achieve enhanced color reproducibility of a color character, and a computer-readable recording medium which records an image processing program capable thereof.

In order to achieve the above object, according to one aspect of the present invention, there is provided an image processing apparatus which comprises: a character-area extraction section operable to extract a character area from color image data; a color-difference-value acquisition section operable to acquire information about respective color-difference values of pixels in the character area extracted by the character-area extraction section; a color-color-saturation-value acquisition section operable to acquire information about respective color saturation values of the pixels in the character area extracted by the character-area extraction section; a color-difference-subrange storage section which stores a plurality of color-difference subranges pre-defined by dividing an overall color-difference range of zero degree to 360 degree into a plurality of subranges; a chromatic-region determination section operable, when the information about the color salutation values of the pixels in the character area acquired by the color-color-saturation-value acquisition section fails to satisfy a preset determination condition for determining whether a character area has a chromatic color, to determine the character area as a gray region, and, when the information about the color salutation values of the pixels in the character area satisfies the determination condition, to determine the character area as a chromatic region; a first color-difference-subrange assignment section operable, based on the information about the pixel color-difference values acquired by the color-difference-value acquisition section, to assign any one of the plurality of color-difference subranges stored in the color-difference-subrange storage section, to the character area determined as the chromatic region by the chromatic-region determination section; and a representative-color setup section operable to set color information about a representative color of the character area determined as the chromatic region by the chromatic-region determination section, using an average of the pixel color-difference values acquired by the color-difference-value acquisition section and included in the color-difference subrange assigned to the character area.

According to another aspect of the present invention, there is provided a computer-readable recording medium which records an image processing program for causing a computer to function as: a character-area extraction section operable to extract a character area from color image data; a color-difference-value acquisition section operable to acquire information about respective color-difference values of pixels in the character area extracted by the character-area extraction section; a color-color-saturation-value acquisition section operable to acquire information about respective color saturation values of the pixels in the character area extracted by the character-area extraction section; a color-difference-subrange storage section which stores a plurality of color-difference subranges pre-defined by dividing an overall color-difference range of zero degree to 360 degree into a plurality of subranges; a chromatic-region determination section operable, when the information about the color salutation values of the pixels in the character area acquired by the color-color-saturation-value acquisition section fails to satisfy a preset determination condition for determining whether a character area has a chromatic color, to determine the character area as a gray region, and, when the information about the color salutation values of the pixels in the character area satisfies the determination condition, to determine the character area as a chromatic region; a first color-difference-subrange assignment section operable, based on the information about the pixel color-difference values acquired by the color-difference-value acquisition section, to assign any one of the plurality of color-difference subranges stored in the color-difference-subrange storage section, to the character area determined as the chromatic region by the chromatic-region determination section; and a representative-color setup section operable to set color information about a representative color of the character area determined as the chromatic region by the chromatic-region determination section, using an average of the pixel color-difference values acquired by the color-difference-value acquisition section and included in the color-difference subrange assigned to the character area.

In the above image processing apparatus and the above computer-readable recording medium which records the image processing program, an average of the pixel color-difference values included in the color-difference subrange assigned to the character area determined as the chromatic region is set as color information about a representative color of the character area. Thus, differently from the conventional technique configured to set a representative color of a character area using a color-difference value exhibiting a peak in a histogram, a representative color of a character area is acquired in consideration with a wider range of color-difference values in addition to that at a peak in a histogram covering a color-difference subrange with a certain width. This makes it possible to achieve enhanced color reproducibility of a color character.

DETAILED DESCRIPTION OF THE PREFERRED EMBODIMENTS

Figure 1:
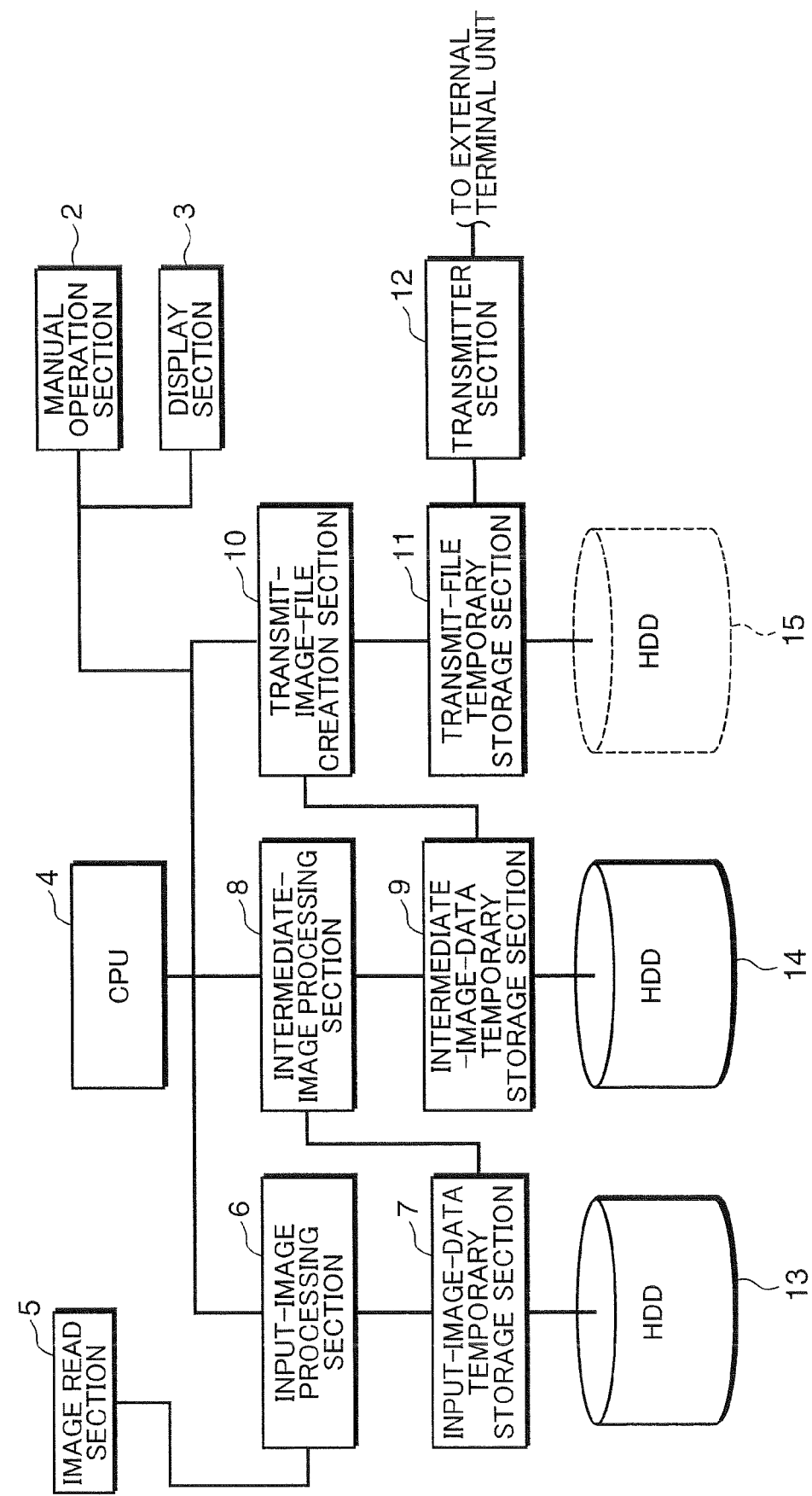
FIG. 1 is a block diagram showing the configuration of a scanner apparatus which is one example of an image processing apparatus according to one embodiment of the present invention.

An embodiment of the present invention will now be described based on the drawings. In the figures, it denotes that two or more elements or components assigned with the same reference numerals or codes are identical to each other, and therefore a duplicate description about such elements or components will be omitted. FIG. 1 is a block diagram showing the configuration of a scanner apparatus which is one example of an image processing apparatus according to one embodiment of the present invention.

The scanner apparatus 1 illustrated in FIG. 1 comprises a manual operation section 2, a display section 3, a CPU (Central Processing Unit) 4, an image read section 5, an input-image processing section 6, an input-image-data temporary storage section 7, an intermediate-image processing section 8, an intermediate-image-data temporary storage section 9, a transmit-image-file creation section 10, a transmit-file temporary storage section 11, a transmitter section 12, and two HDDs (Hard Disk Drives) 13, 14. The image processing apparatus subject to the present invention may be a complex machine provided, for example, by adding an image forming section to the scanner apparatus 1 so as to additionally have a copy function.

The manual operation section 2 includes a manual operation key switch adapted to accept a user's operational instruction, or a communication interface circuit adapted to accept a user's operational instruction from an external terminal unit (not shown), such as a personal computer, which is connected to the scanner apparatus 1 via a network or an interconnection cable. The display section 3 includes a display unit, such as a liquid-crystal display panel.

The CPU 4 is operable to execute a control program stored in a ROM (Read Only Memory) or HDD (not shown) so as to control respective operations of the display section 3, the image read section 5, the input-image processing section 6, the input-image-data temporary storage section 7, the intermediate-image processing section 8, the intermediate-image-data temporary storage section 9, the transmit-image-file creation section 10 (serving as a combined-data creation section), the transmit-file temporary storage section 11, the transmitter section 12, and the HDDs 13, 14 (serving as a color-difference-subrange storage section), according to a user's operational instruction accepted through the manual operation section 2. Each of the input-image processing section 6, the intermediate-image processing section 8 and the transmit-image-file creation section 10 is composed, for example, of an ASIC (Application Specific Integrated Circuit). Each of the input-image-data temporary storage section 7, the intermediate-image-data temporary storage section 9 and the transmit-file temporary storage section 11 includes a temporary storage unit composed, for example, using a DRAM (Dynamic Random Access Memory). The HDDs 13, 14 may be a single HDD unit.

While each of the input-image processing section 6, the intermediate-image processing section 8 and the transmit-image-file creation section 10 in this embodiment is composed of a hardware circuit, such as an ASIC, the present invention is not limited to this configuration. For example, the CPU 4 may be configured to execute an image processing program stored in a ROM or HDD (not shown) so as to function as each of the input-image processing section 6, the intermediate-image processing section 8 and the transmit-image-file creation section 10.

For example, the scanner apparatus 1 may comprise an image read section 5, and a computer, such as a personal computer, which is connected to the image read section 5 via a communication cable or the like, and provided with the manual operation section 2, the display section 3, the CPU 4, the image read section 5, the input-image processing section 6, the input-image-data temporary storage section 7, the intermediate-image processing section 8, the intermediate-image-data temporary storage section 9, the transmit-image-file creation section 10, the transmit-file temporary storage section 11, the transmitter section 12, and the HDDs 13, 14.

In this case, for example, the CPU 4 may be configured to execute an image processing program stored in a ROM or HDD (not shown) so as to function as each of the input-image processing section 6, the intermediate-image processing section 8 and the transmit-image-file creation section 10.

The image read section 5 includes an image scanner comprising a CCD (Charge Coupled Device). The image read section 5 is operable to read a color image of a document, and output a signal indicative of the color image to the input-image processing section 6, according to a control signal from the CPU 4.

The input-image processing section 6 is operable to convert the signal output from the image read section 5 into a given data format so as to create color image data which expresses a color image by three pixel values corresponding to respective colors: C (cyan), M (magenta) and Y (yellow), and store the color image data in the input-image-data temporary storage section 7. The CPU 4 may be configured to allow the color image data stored in the input-image-data temporary storage section 7 to be additionally stored in the HDD 13.

The intermediate-image processing section 8 is operable to subject the color image data stored in the input-image-data temporary storage section 7 to a given image processing so as to create intermediate image data, and store the intermediate image data in the intermediate-image-data temporary storage section 9. The CPU 4 may be configured to allow the intermediate image data stored in the intermediate-image-data temporary storage section 9 to be additionally stored in the HDD 14.

Figure 2:
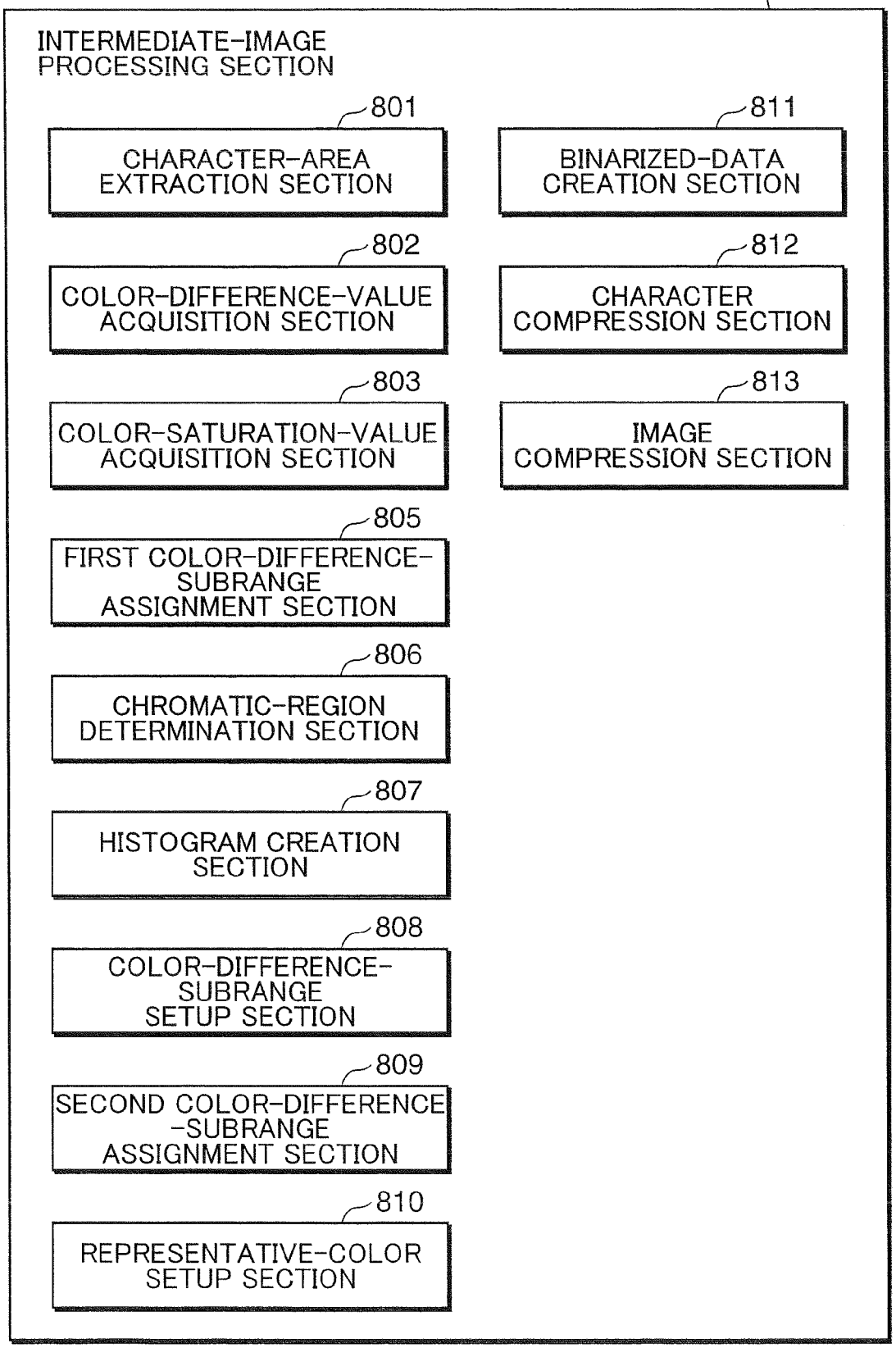
FIG. 2 is a block diagram showing one example of the configuration of an intermediate-image processing section illustrated in FIG. 1.

FIG. 2 is a block diagram showing one example of the configuration of the intermediate-image processing section 8. An intermediate-image processing section 8 illustrated in FIG. 2 comprises a character-area extraction section 801, a color-difference-value acquisition section 802, a color-saturation-value acquisition section 803, a first color-difference-subrange assignment section 805, a chromatic-region determination section 806, a histogram creation section 807, a color-difference-subrange setup section 808, a second color-difference-subrange assignment section 809, a representative-color setup section 810, a binarized-data creation section 811, a character compression section 812 and an image compression section 813.

The character-area extraction section 801 is operable to extract one or more character areas separated by a character or by a group of characters located within a given region, from the document image data stored in the input-image-data temporary storage section 7, in a conventional manner.

The color-difference-value acquisition section 802 is operable to calculate a color-difference value (i.e., hue angle) of each pixel in each of the character areas extracted by the character-area extraction section 801. Specifically, the color-difference-value acquisition section 802 is operable to read out pixels in each of the character areas, from the color image data stored in the input-image-data temporary storage section 7, and compare C, M and Y pixel values with respect to each of the pixels. Then, the color-difference-value acquisition section 802 is operable, when a smallest one of the pixel values is the C pixel value, the M pixel value, and the Y pixel value, to calculate a color-difference value HUE of each of the pixels, according to the following formula (1), the following formula (2), and the following formula (3), respectively:

$$HUE = 60° + \frac{(Y - M) \times 60°}{|Y - M|} \quad (1)$$

$$HUE = 180° + \frac{(C - Y) \times 60°}{|C - Y|} \quad (2)$$

$$HUE = 300° + \frac{(M - C) \times 60°}{|M - C|} \quad (3)$$

The color-saturation-value acquisition section 803 is operable to calculate a color saturation value SAT of each pixel in each of the character areas extracted by the character-area extraction section 801. Specifically, the color-saturation-value acquisition section 803 is operable to read out pixels in each of the character areas, from the color image data stored in the input-image-data temporary storage section 7, and calculate a color saturation value SAT with respect to each of the pixels, according to the following formula (4):

$$SAT = \frac{(MAX(C, M, Y) - MIN(C, M, Y)) \times 360°}{MAX(C, M, Y)}, \quad (4)$$

wherein MAX (C, M, Y) represents a maximum one of the C, M and Y pixel values, and MIN (C, M, Y) represents a minimum one of the C, M and Y pixel values.

Figure 3:
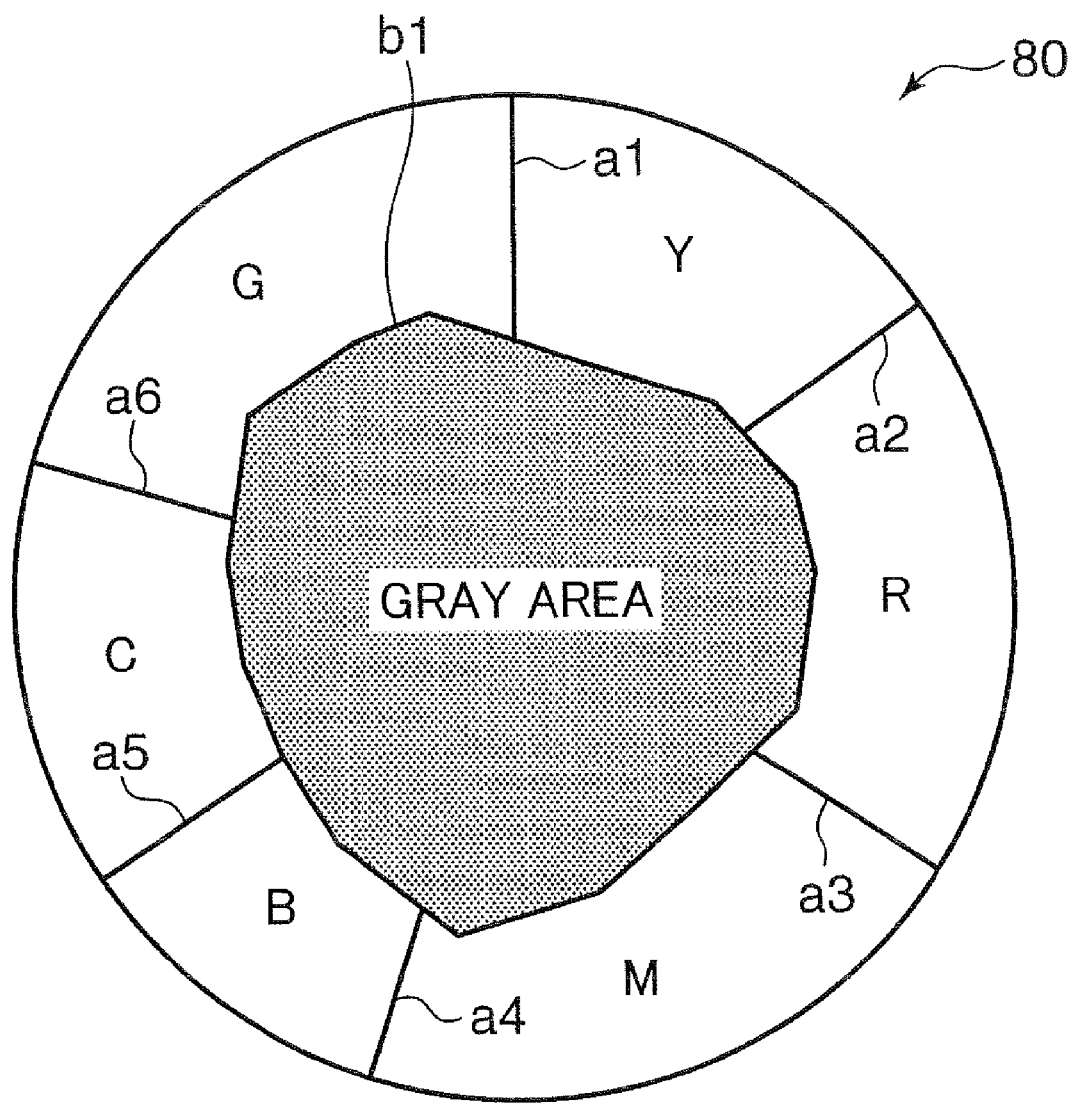
FIG. 3 is an explanatory diagram showing a relationship between an L*a*b color coordinate system which represents a color difference value on a circle by an angle (i.e., hue angle) from zero degree to 360 degrees and a color saturation value by a distance from a center of the circle, and a preset color-difference subrange corresponding to each of six colors: C (cyan), M (magenta), Y (yellow), R (red), G (green) and B (blue).

FIG. 3 is an explanatory diagram showing a relationship between an L*a*b color coordinate system which represents a color difference value on a circle by an angle (i.e., hue angle) from zero degree to 360 degrees and a color saturation value by a distance from a center of the circle, and a color difference subrange corresponding to each of six colors: C (cyan), M (magenta), Y (yellow), R (red), G (green) and B (blue), which is pre-stored, for example, in the HDD 13.

The L*a*b color coordinate system illustrated in FIG. 3 is delimited by six boundary values a1, a2, a3, a4, a5, a6. The HDD 13 pre-stores: a range of the boundary value a1 to less than the boundary value a2, which serves as a color-difference subrange (i.e., hue angle range) corresponding to Y (yellow); a range of the boundary value a2 to less than the boundary value a3, which serves as a color-difference subrange corresponding to R (red); a range of the boundary value a3 to less than the boundary value a4, which serves as a color-difference subrange corresponding to M (magenta); a range of the boundary value a4 to less than the boundary value a5, which serves as a color-difference subrange corresponding to B (blue); a range of the boundary value a5 to less than the boundary value a6, which serves as a color-difference subrange corresponding to C (cyan); and a range of the boundary value a6 to less than the boundary value a1, which serves as a color-difference subrange corresponding to G (green).

The HDD further pre-stores a gray-region determination threshold b1 for determining whether each pixel is a gray region.

The first color-difference-subrange assignment section 805 is operable to read out the color-difference subranges corresponding to the respective colors: C (cyan), M (magenta), Y (yellow), R (red), G (green) and B (blue), from the HDD 13, and assign any one of the color-difference subranges corresponding to the respective colors: C (cyan), M (magenta), Y (yellow), R (red), G (green) and B (blue), to each of the character areas, based on the read-out color-difference subranges, and information about the pixel color-difference values calculated for each of the character areas by the color-difference-value acquisition section 802.

With respect to the character areas assigned with the respective color-difference subranges by the first color-difference-subrange assignment section 805, the chromatic-region determination section 806 is operable, based on information about the pixel color saturation values calculated for each of the character areas by the color-saturation-value acquisition section 803, to determine whether each of the character areas is a gray region, in such a manner that, if an overall color saturation value in a specific one of the character areas, e.g., an average of the color saturation values of the pixels included in a specific one of the character areas, is less than the gray-region determination threshold b1 stored in the HDD 13, the specific character area is determined to be a gray region, and assign Bk (Black) to the character area determined as the gray region. In this case, each of the remaining character areas other than the character area determined as the gray region will be determined as a chromatic region.

The histogram creation section 807 is operable, based on information about the pixel color-difference values calculated by the color-difference-value acquisition section 802 with respect to each of the character areas determined as the chromatic region, to create a histogram which represents an occurrence rate (e.g. the number) of pixels relative to a color-difference value in the color-difference subrange assigned to each of the character areas.

The color-difference-subrange setup section 808 is operable, when a plurality of peaks are included in one histogram created by the histogram creation section 807, to set a plurality of new color-difference subranges in such a manner as to allow each of the new color-difference subranges to include a respective one of the peaks.

The second color-difference-subrange assignment section 809 is operable, based on information about the color-difference values of the pixels in a specific one of the character areas which includes a plurality of peaks, e.g., an average of the color-difference values of the pixels in the specific character area, to re-assign one of the plurality of new color-difference-subranges set by the color-difference-subrange setup section 808, to the specific character area.

The representative-color setup section 810 is operable to set color information about a representative color of each of the character areas. For example, the color information is an average of the color-difference values of pixels included in the color-difference subrange assigned to the character area in the chromatic region (i.e., each of the remaining character areas other than the character area determined as the gray region by the chromatic-region determination section 806). And the representative-color setup section 810 store the color information about the representative color in the intermediate-image-data temporary storage section 9.

The binarized-data creation section 811 is operable to binarize image data about the character areas extracted by the character-area extraction section 801 so as to create character image data. The character compression section 812 is operable to compress the character image data created by the binarized-data creation section 811, for example, using an reversible MMR scheme, and store the compressed character image data in the intermediate-image-data temporary storage section 9.

The image compression section 813 is operable to compress remaining image data other than the character areas in the color image data stored in the input-image-data temporary storage section 7, for example, using an irreversible JPEG scheme having a high data compression ratio, and store the compressed image data in the intermediate-image-data temporary storage section 9. The CPU 4 may be configured to allow the color image data stored in the intermediate-image-data temporary storage section 9, to be additionally stored in the HDD 13.

Returning to FIG. 1, the transmit-image-file creation section 10 is operable to combine the color information, the compressed character image data and the compressed image data stored in the intermediate-image-data temporary storage section 9, together, so as to create an electronic file, such as a high-compression PDF (Portable Document Format) file or an XPS (XML Paper Specification) file, and store the electronic file in the transmit-file temporary storage section 11.

The transmitter section 12 includes a communication interface circuit which is connected to an external terminal unit, such as a personal computer, via a LAN (Local Area Network) or cable (not shown), and adapted to transmit the electronic file stored in the transmit-file temporary storage section 11, to the external terminal unit. The scanner apparatus 1 may further include a HDD 15. In this case, the CPU 4 may be configured to allow the electronic file stored in the transmit-file temporary storage section 11, to be additionally stored to the HDD 15.

Figure 4:
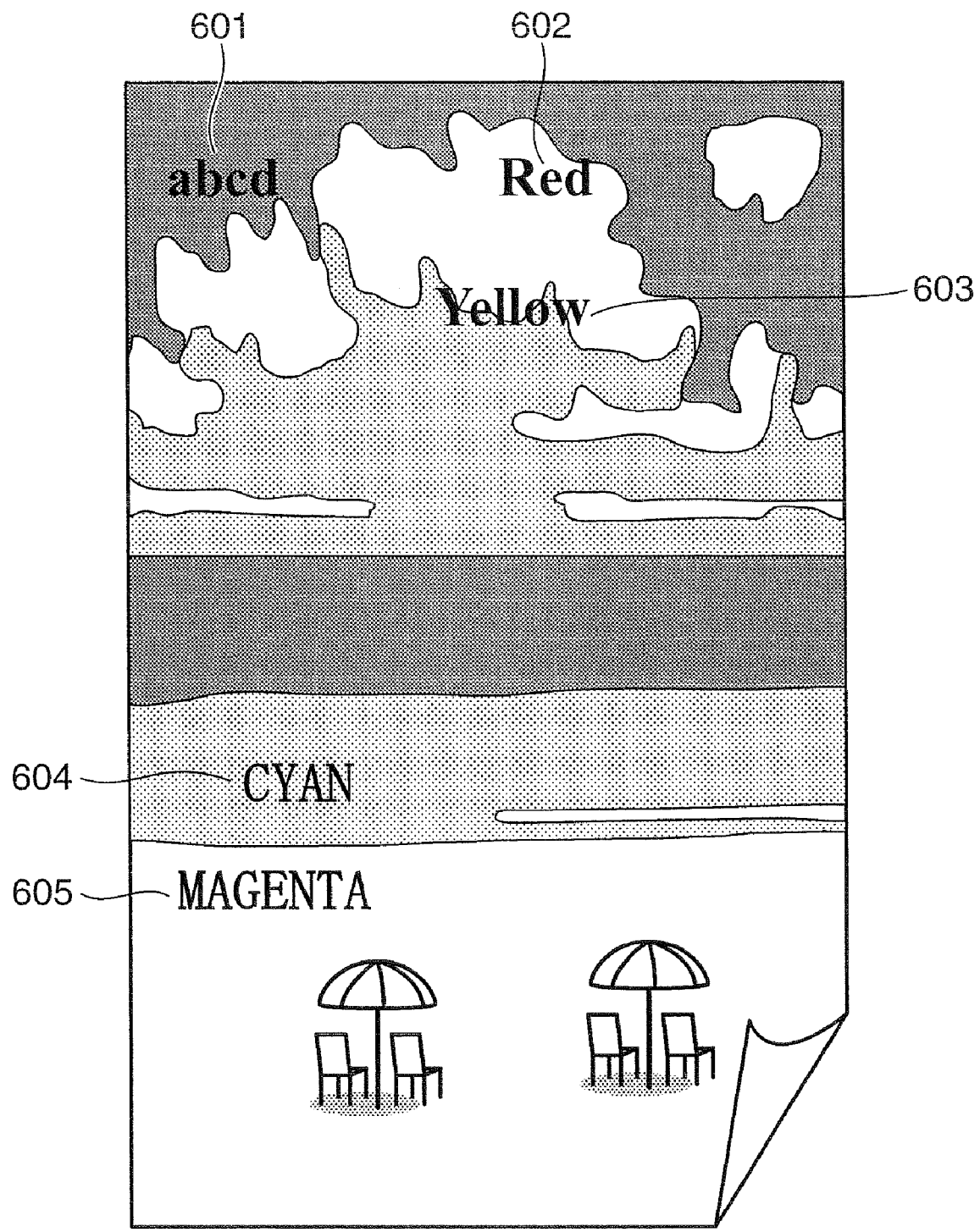
FIG. 4 is an explanatory diagram showing one example of a color image of a document.

An operation of the scanner apparatus 1 configured as above will be described below. FIG. 4 is an explanatory diagram showing one example of a color image of a document. The color document image illustrated in FIG. 4 has a background color image, and a plurality of characters consisting of a black character 601, a red character 602, a yellow character 603, a cyan character 604 and a magenta character 605 which are superimposed on the background color image.

Figure 5:
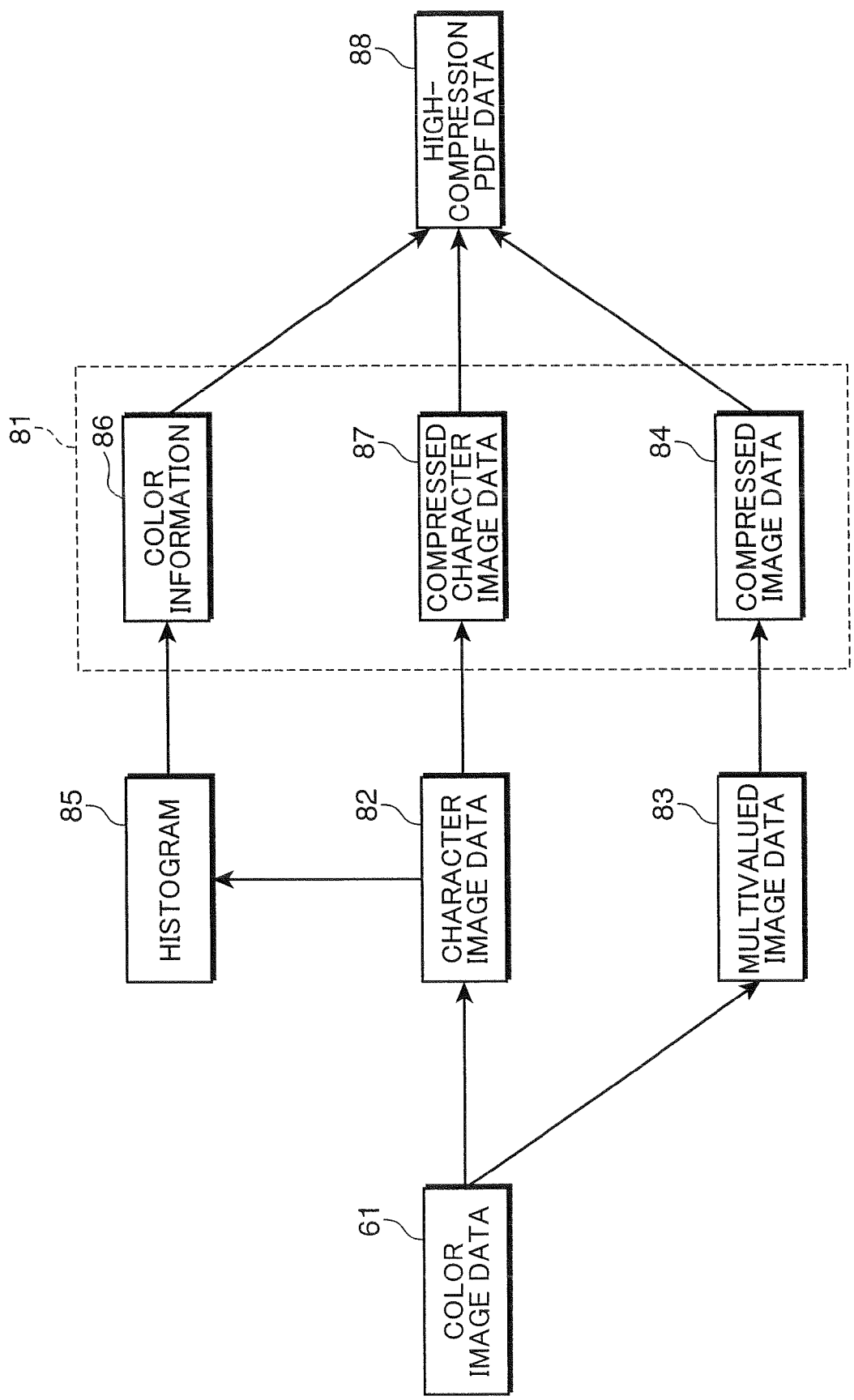
FIG. 5 is a schematic diagram for explaining an operation of the scanner apparatus illustrated in FIG. 1.

FIG. 5 is a schematic diagram for explaining an operation of the scanner apparatus 1. Upon acceptance of a user's operational instruction through the manual operation section 2, according to a control signal from the CPU 4, the image read section 5 reads the color document image, and outputs a signal indicative of the read image to the input-image processing section 6. Then, based on the signal output from the image read section 5, the input-image processing section 6 creates color image data 61 which expresses the color document image by three pixel values corresponding to respective colors: C (cyan), M (magenta) and Y (yellow), and store the color image data 61 in the input-image-data temporary storage section 7.

Then, the intermediate-image processing section 8 subjects the color image data stored in the input-image-data temporary storage section 7 to a given image processing so as to create intermediate image data, and stores the intermediate image data in the intermediate-image-data temporary storage section 9.

Figure 6:
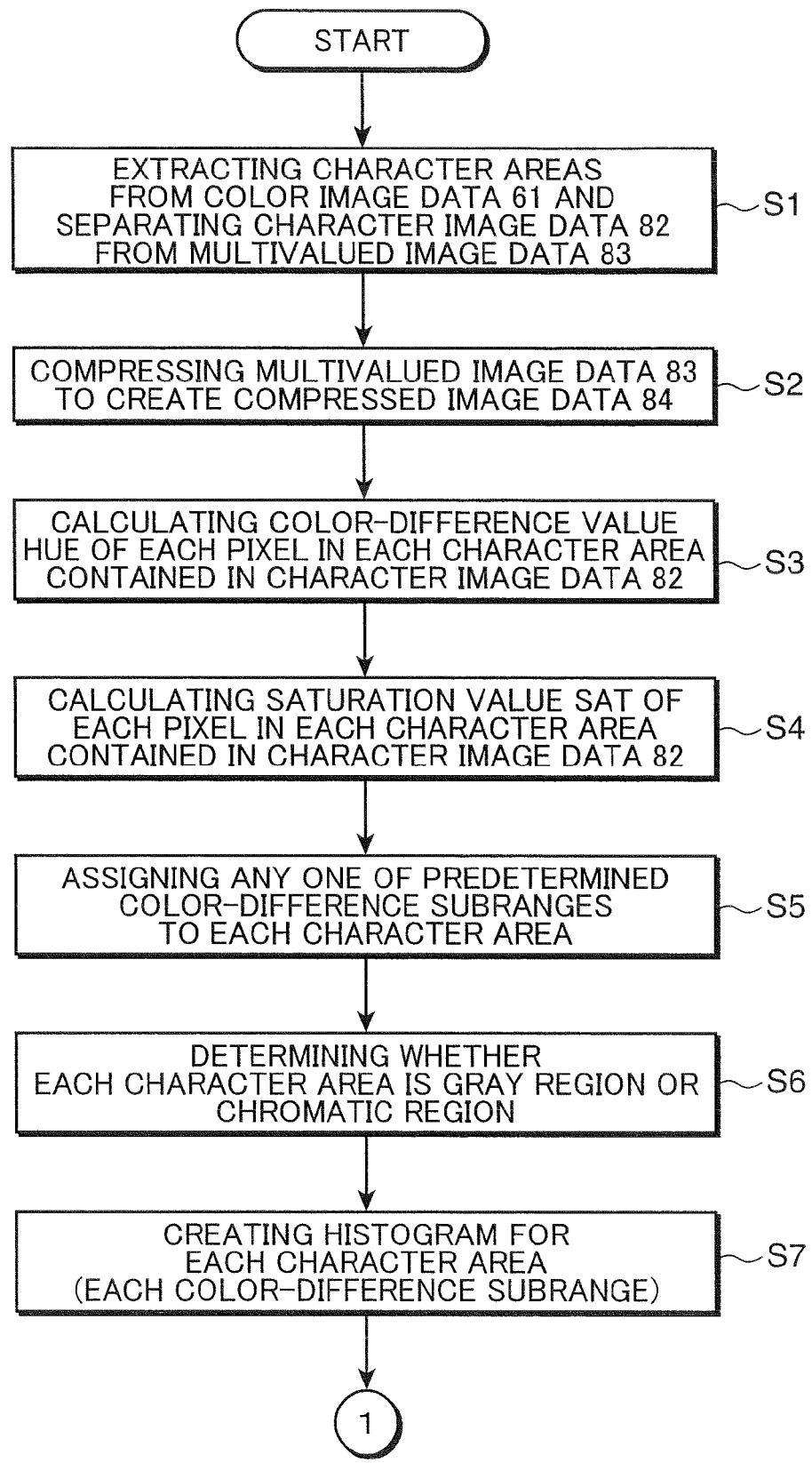
FIG. 6 is a flowchart showing one example of an operation of the intermediate-image processing section illustrated in FIG. 1.
Figure 7:
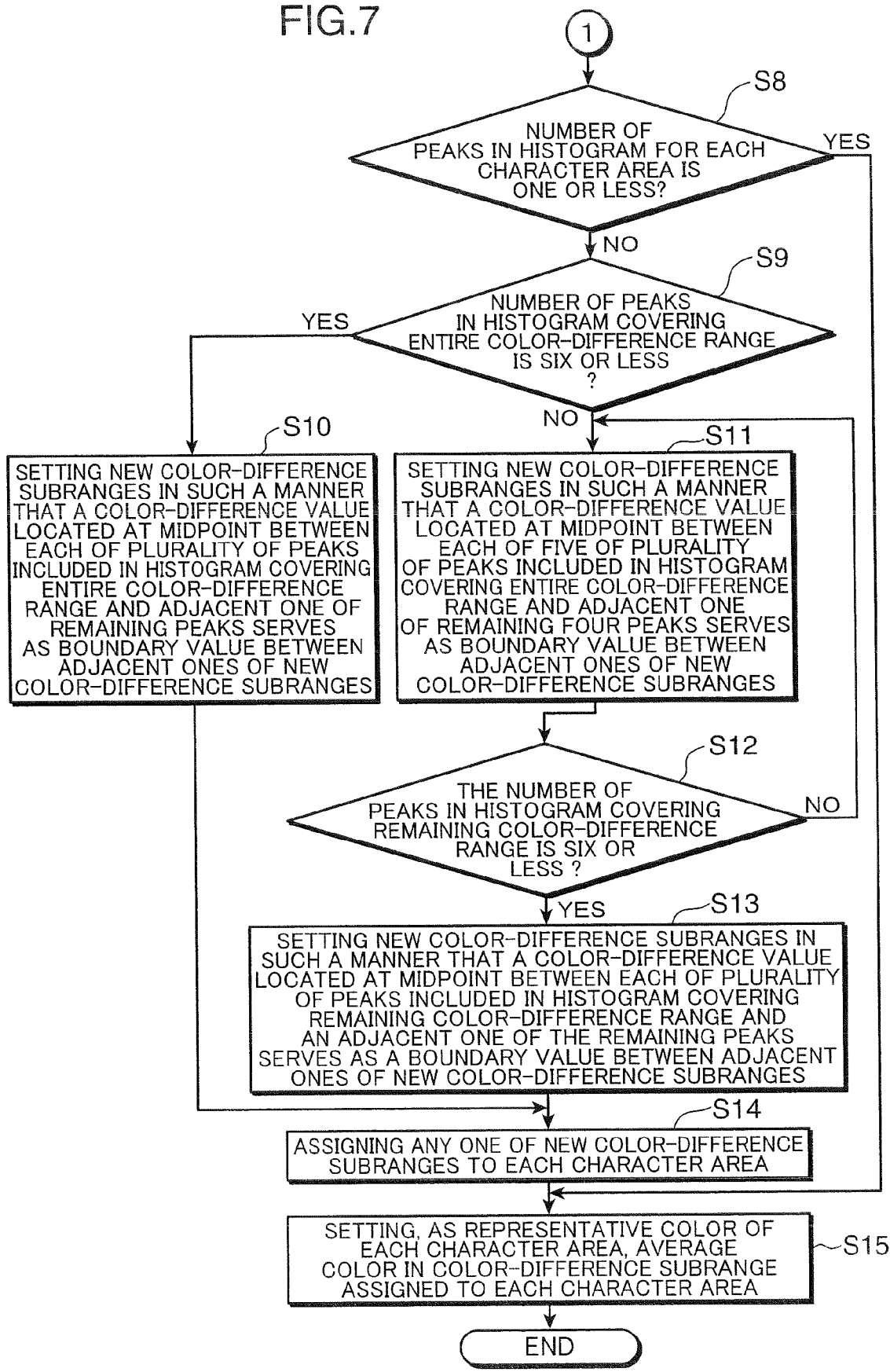
FIG. 7 is a flowchart showing one example of an operation of the intermediate-image processing section illustrated in FIG. 1.

FIGS. 6 and 7 are flowcharts showing one example of an operation of the intermediate-image processing section 8. In Step S1, the character-area extraction section 801 extracts one or more character areas from the color image data 61 (document image data) stored in the input-image-data temporary storage section 7, and then the binarized-data creation section 811 binarizes image data about the character areas to create character image data 82, and stores the character image data 82 in the intermediate-image-data temporary storage section 9.

For example, the character image data 82 is created to contain a plurality of character areas which are separated from each other by a character. The character-area extraction section 801 also extracts the remaining image data other than the character areas, from the color document image 61, and stores the remaining image data in the intermediate-image-data temporary storage section 9 in the form of multivalued image data 83.

Then, the image compression section 813 compresses the multivalued image data 83 stored in the intermediate-image-data temporary storage section 9, for example, using a JPEG scheme, to create compressed image data 84, and stores the compressed image data 84 in the intermediate-image-data temporary storage section 9 (Step S2).

Then, the color-difference-value acquisition section 802 calculates a color-difference value (i.e., hue angle) of each pixel in each of the character areas contained in the character image data 82 (Step S3). Specifically, the color-difference-value acquisition section 802 reads out pixels in each of the character areas, from the color image data 82, and compare C, M and Y pixel values with respect to each of the pixels. Then, when a smallest one of the pixel values is the C pixel value, the M pixel value, and the Y pixel value, the color-difference-value acquisition section 802 calculates a color-difference value HUE of each of the pixels, according to the aforementioned formula (1), the aforementioned formula (2), and the aforementioned formula (3), respectively.

Then, color-saturation-value acquisition section 803 calculates a color saturation value SAT of each pixel in each of the character areas extracted by the character-area extraction section 801. Specifically, the color-saturation-value acquisition section 803 reads out pixels in each of the character areas, from the character image data 82, and calculates a color saturation value SAT with respect to each of the pixels, according to the aforementioned formula (4) (Step S4).

Then, the first color-difference-subrange assignment section 805 reads out the color-difference subranges corresponding to the respective colors: C (cyan), M (magenta), Y (yellow), R (red), G (green) and B (blue), from the HDD 13. Subsequently, based on information about the pixel color-difference values calculated for each of the character areas by the color-difference-value acquisition section 802, the first color-difference-subrange assignment section 805 assigns any one of the read-out color-difference subranges to each of the character areas, for example, in such a manner as to allow an average of the color-difference values of the pixels in each of the character areas to be included in the color-difference subrange which is to be assigned to the character areas (Step S5).

Then, based on information about the pixel color saturation values calculated for each of the character areas by the color-saturation-value acquisition section 803, the chromatic-region determination section 806 determines whether each of the character areas is a gray region, in such a manner that, if an overall color saturation value in a specific one of the character areas, e.g., an average of the color saturation values of the pixels included in a specific one of the character areas, is less than the gray-region determination threshold b1 stored in the HDD 13, the specific character area is determined as the gray region, and assigns Bk (Black) to the character area determined as the gray region, so that each of the remaining character areas other than the character area determined as the gray region is determined as a chromatic region (Step S6).

Figure 8:
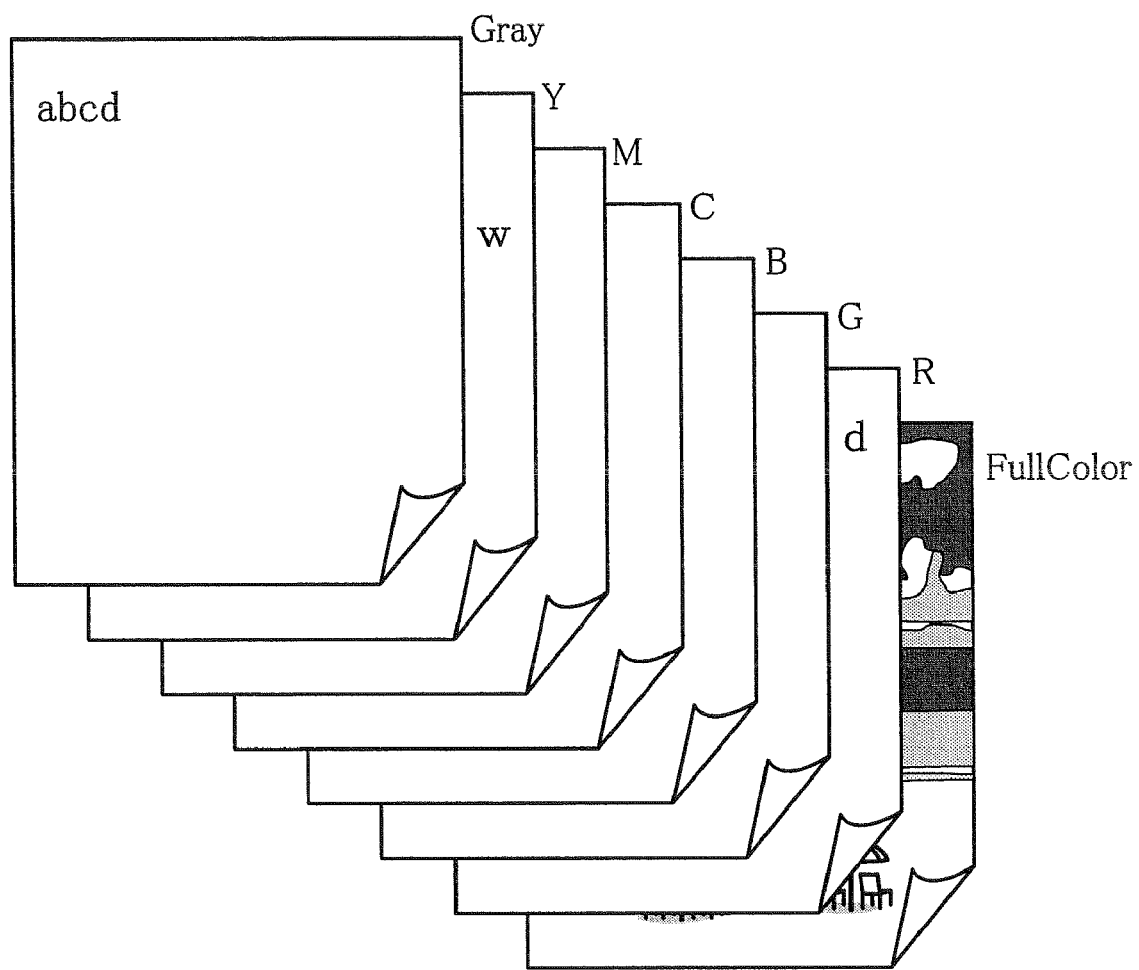
FIG. 8 is a schematic diagram for explaining a color-difference-subrange assigning processing.

As above, through the processing in Steps S5 and S6, for example, the black character 601, the yellow character 603, the magenta character 605, the cyan character 604 and the red character 602 in the document image illustrated in FIG. 4 are sorted into Gray, Y (yellow), M (magenta), C (cyan) and R (red), respectively, as shown in FIG. 8.

Then, based on information about the pixel color-difference values calculated by the color-difference-value acquisition section 802, the histogram creation section 807 creates a histogram for each of the character areas, wherein the histogram represents an occurrence rate of pixels relative to a color-difference value in a specific subrange assigned to each of the character areas determined as the chromatic region (Step S7).

Figure 9:
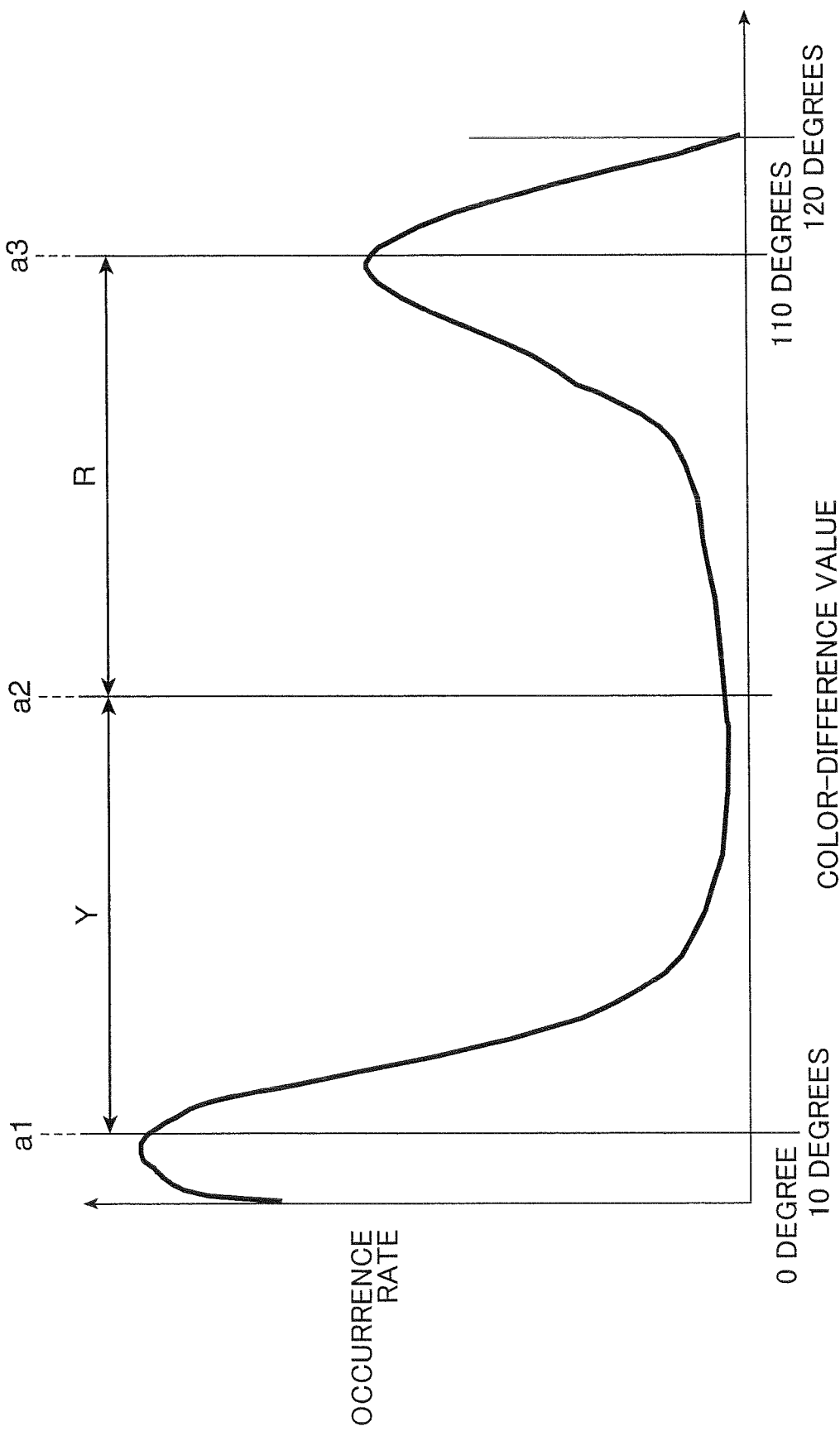
FIG. 9 is a graph for explaining an operation of a histogram creation section illustrated in FIG. 2.

FIG. 9 is a graph for explaining an operation of the histogram creation section 807. In the histogram illustrated in FIG. 9, the horizontal axis represents a color-difference value, and the vertical axis represents an occurrence rate of pixels relative to the color-difference value on the horizontal axis, wherein the color-difference value is in the subrange of zero degree to 120 degrees.

For example, when a color-difference subrange assigned to a target one of the character areas is a Y color-difference subrange (i.e., color-difference subrange corresponding to Y (yellow)), the histogram creation section 807 is operable to read out the boundary values a1, a2 stored in the HDD 13 as the Y color-difference subrange, and create a histogram covering the subrange of the boundary value a1 to the boundary value a2, as shown in FIG. 9. In the same manner, for example, when a color-difference subrange assigned to a target one of the character areas is a R color-difference subrange (i.e., color-difference subrange corresponding to R (red)), the histogram creation section 807 is operable to read out the boundary values a2, a3 stored in the HDD 13, and create a histogram covering the subrange of the boundary value a2 to the boundary value a3.

Then, when a plurality of peaks are included in a histogram created for each of the character areas by the histogram creation section 807, the color-difference-subrange setup section 808 newly set a plurality of color-difference subranges in such a manner that each of the plurality of color-difference subranges includes a respective one of the plurality of peaks. Specifically, the color-difference-subrange setup section 808 determines whether the number of peaks included in a histogram for each of the character areas is one or less (Step S8). If the number of peaks is one or less (YES in Step S8), there is no need to change the color-difference subrange, and thereby the routine will skip to Step S15 to set the color information about a representative color for each of the character areas. When the number of peaks is two or more (NO in Step S8), the routine advances to Step S9 to re-set all color-difference subranges defined by dividing an overall color-difference range (zero degree to 360 degrees).

Figure 10:
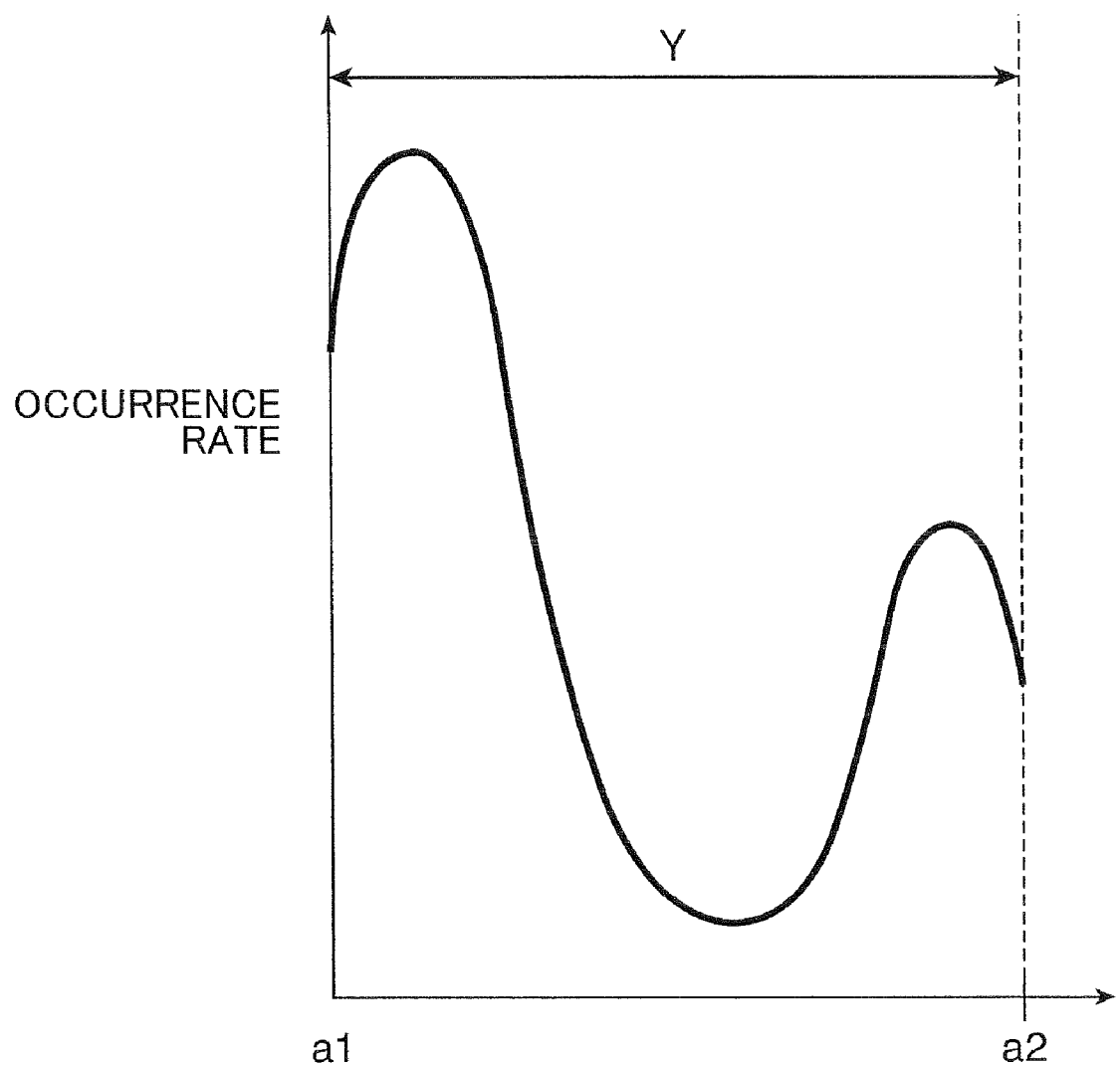
FIG. 10 is an explanatory diagram showing a state when a plurality of peaks are included in a histogram for one character area.

FIG. 10 is an explanatory diagram showing a state when a plurality of peaks are included in a histogram for a certain one of the character areas. For example, when a color-difference subrange assigned to a target one of the character areas is the Y (yellow) color-difference subrange, the histogram creation section 807 is operable to read out the boundary values a1, a2 stored in the HDD 13 as the Y color-difference subrange, and create a histogram covering the subrange of the boundary value a1 to the boundary value a2.

The histogram covering the subrange of the boundary value a1 to the boundary value a2 is likely to have a plurality of peaks, e.g., two peaks, as shown in FIG. 10. If the color information about a representative color for the target character area is set using an average of the color saturation values which is calculated in the subrange of the boundary value a1 to the boundary value a2, a mixed color as a blend of plural colors will be set as the color information about a representative color to cause the risk of deterioration in color reproducibility of a color character.

With a view to avoiding this problem, if the number of peaks is two or more (NO in Step S8), all the color-difference subranges defined by dividing the overall color-difference range (zero degree to 360 degrees) will be re-set to reduce the risk that a mixed color, i.e., a blend of plural colors, is set as a representative color of the target character area.

Specifically, in Step S9, the color-difference-subrange setup section 808 determines whether the number of peaks in a histogram covering the overall color-difference range is equal to or less than a specific number (e.g., six or less), for example, which is determined in terms of processability by a hardware circuit (Step S9). When the number is six or less (YES in Step S9), the color-difference-subrange setup section 808 sets a plurality of new color-difference subranges in such a manner that a color-difference value located at a midpoint between each of the plurality of peaks included in the histogram covering the overall color-difference range and an adjacent one of the remaining peaks serves as a boundary value between adjacent ones of the new color-difference subranges (Step S10). Then, the routine advances to Step S14 to assign any one of the new color-difference subranges to each of the character areas.

Figure 11:
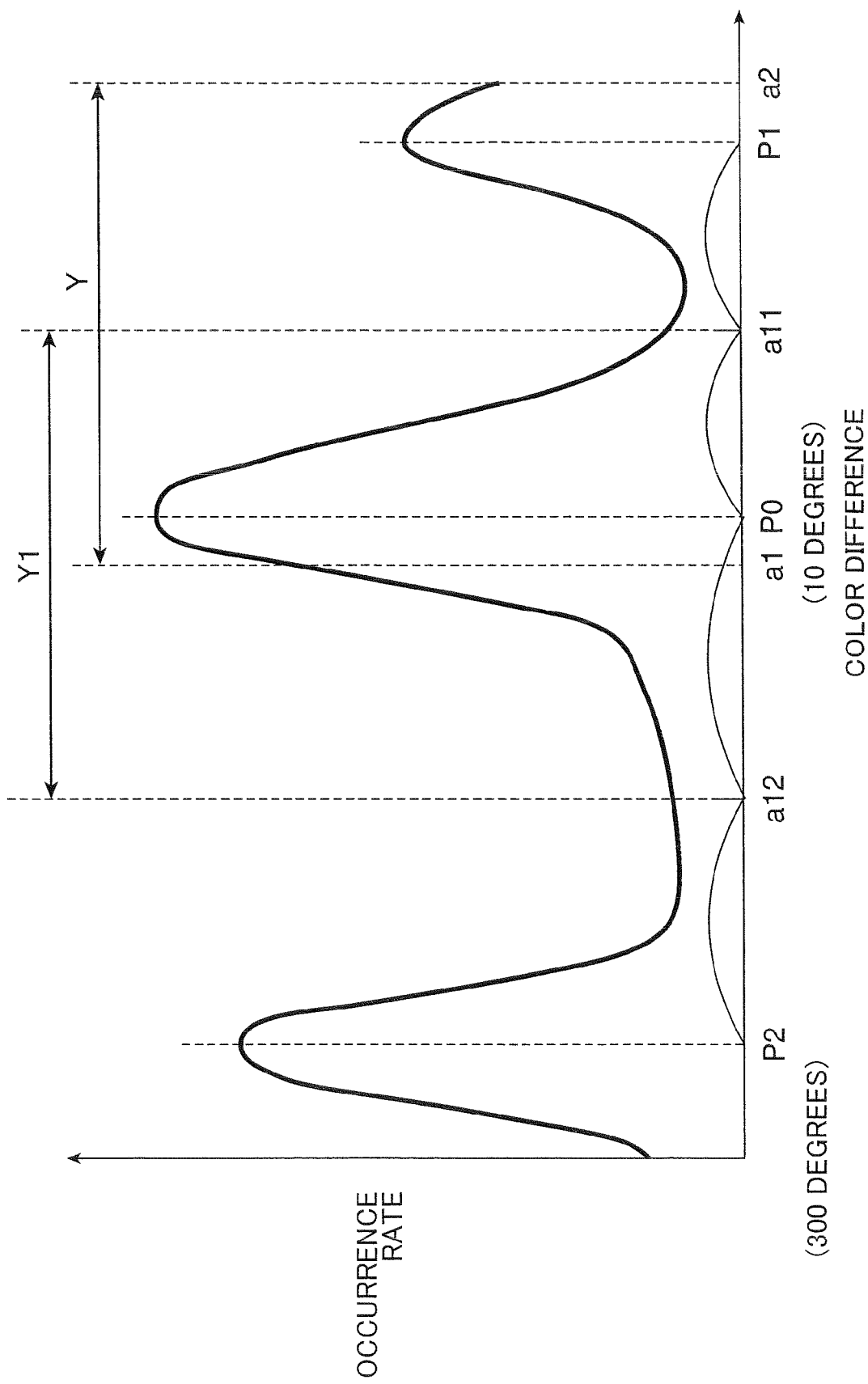
FIG. 11 is a graph for explaining a color-difference-subrange setting processing by a color-difference-subrange setup section illustrated in FIG. 2.

FIG. 11 is a graph for explaining a color-difference-subrange setting processing by the color-difference-subrange setup section 808. For example, when a target one of the character areas is assigned with the subrange of the boundary value a1 to boundary value a2 which is the Y (yellow) color-difference subrange, and two peaks P0, P1 are included in the color-difference subrange of the boundary value a1 to boundary value a2, as shown in FIG. 11, the color-difference-subrange setup section 808 is operable to set a color-difference value a11 at a midpoint between the peaks P0, P1, as a new boundary value a11.

The color-difference-subrange setup section 808 is also operable to calculate a color-difference value a12 located at a midpoint between the peak P0 and a peak P2 on an opposite side of the peak P1 and adjacent to the peak P0, and set the color-difference value a12 as a new boundary value a12. Then, the color-difference-subrange setup section 808 is operable to set a color-difference subrange Y1 of the boundary value a12 to the boundary value a11, as a new color-difference subrange. In this case, when a color-difference value of the peak P0 is 10 degrees, the color-difference-subrange setup section 808 is operable to perform a search of the peak P2, for example, in the subrange of 300 to 360 degrees.

In the same manner as that for the color-difference subrange Y1 illustrated in FIG. 11, the color-difference-subrange setup section 808 is operable to set the remaining new color-difference subranges in such a manner that a color-difference value located at a midpoint between each of the plurality of peaks included in the histogram covering the overall color-difference range and an adjacent one of the remaining peaks serves as a boundary value between adjacent ones of the new color-difference subranges.

Returning to FIG. 7, when it is determined in Step S9 that the number of peaks in the histogram covering the overall color-difference range is greater than six (NO in Step S9), the color-difference-subrange setup section 808 sets new color-difference subranges based on five of the plurality of peaks included in the histogram covering the overall color-difference range, in the same manner as that in Step S10, i.e., in such a manner that a color-difference value located at a midpoint between each of the five peaks and an adjacent one of the remaining four peaks serves as a boundary value between adjacent ones of the new color-difference subranges (Step S11).

Then, the color-difference-subrange setup section 808 determines whether the number of peaks in a histogram covering the remaining color-difference subranges other than the new color-difference subranges set in Step S11 is six or less (Step S12). If the number is greater than six (NO in Step S12), Steps S11 and S12 will be repeated. Differently, when the number is six or less (YES in Step S12), the color-difference-subrange setup section 808 sets a plurality of new color-difference subranges in such a manner that a color-difference value located at a midpoint between each of the peaks included in the histogram covering the remaining color-difference subranges other than the new color-difference subranges set in Step S11 and an adjacent one of the remaining peaks serves as a boundary value between adjacent ones of the new color-difference subranges (Step S13). Then, the routine advances to Step S14 to assign any one of the new color-difference subranges to each of the character areas.

Then, in Step S14, the second color-difference-subrange assignment section 809 assigns any one of the new color-difference subranges set by the color-difference-subrange setup section 808, to each of the character areas, for example, in such a manner as to allow an average of the color-difference values of the pixels in each of the character areas to be included in the new color-difference subrange which is to be assigned to the character area.

Then, in Step S15, the representative-color setup section 810 sets color information about a representative color of each of the character areas, using an average of color-difference values (i.e., average color) included in the color-difference subrange assigned to the character area, and stores information about the representative color, i.e., color information 86, in the intermediate-image-data temporary storage section 9. In this processing, the representative-color setup section 810 may be operable to create the color information 86 based on an average of color-difference values HUE of pixels in each of the character areas in the color-difference subrange assigned to the character area, or based on the average of the color-difference values HUE and an average of color saturation values SAT of the pixels.

As above, through the processing in Steps S1 to S15, an average color of pixels included in each of the character areas is set as a representative color of the character area under a condition that a color-difference subrange of a histogram for each of the character areas is set to include only one peak. That is, color is reproduced in a more delicate manner as compared with the conventional technique configured to set a representative color using only a color-difference value at a peak in the histogram 85. This makes it possible to achieve enhanced color reproducibility of a color character.

Then, the character compression section 812 compresses the character image data 82 stored in the intermediate-image-data temporary storage section 9, for example, using an MMR scheme to create compressed character image data 87, and stores the compressed character image data 87 in the intermediate-image-data temporary storage section 9.

In the above manner, intermediate image data 81 comprising the color information 86, the compressed character image data 87 and the compressed image data 84 is created, and stored in the intermediate-image-data temporary storage section 9.

Then, the transmit-image-file creation section 10 combines the color information 86, the compressed character image data 87 and the compressed image data 84 stored in the intermediate-image-data temporary storage section 9, together, to create an electronic file, such as a high-compression PDF file 88 or an XPS file, and stores the electronic file in the transmit-file temporary storage section 11. For example, in the high-compression PDF file 88, the color information 86 and the compressed character image data 87 are combined as mask information so as to superimpose a character image represented by the compressed character image data 87 on a background image represented by the compressed image data 84, and set a color of the character image to a representative color defined by the color information 86.

Then, the transmitter section 12 transmits the electronic file stored in the transmit-file temporary storage section 11, such as the high-compression PDF file 88, to an external terminal unit, such as a personal computer. This makes it possible to reduce a data volume of the high-compression PDF file 88 to be transmitted to the external terminal unit, while minimizing deterioration in image quality of the character areas, and achieve enhanced color reproducibility of the color character areas.

As mentioned above, according to one aspect of the present invention, there is provided an image processing apparatus which comprises: a character-area extraction section operable to extract a character area from color image data; a color-difference-value acquisition section operable to acquire information about respective color-difference values of pixels in the character area extracted by the character-area extraction section; a color-saturation-value acquisition section operable to acquire information about respective color saturation values of the pixels in the character area extracted by the character-area extraction section; a color-difference-subrange storage section which stores a plurality of color-difference subranges pre-defined by dividing an overall color-difference range of zero degree to 360 degree into a plurality of subranges; a chromatic-region determination section operable, when the information about the color salutation values of the pixels in the character area acquired by the color-saturation-value acquisition section fails to satisfy a preset determination condition for determining whether a character area has a chromatic color, to determine the character area as a gray region, and, when the information about the color salutation values of the pixels in the character area satisfies the determination condition, to determine the character area as a chromatic region; a first color-difference-subrange assignment section operable, based on the information about the pixel color-difference values acquired by the color-difference-value acquisition section, to assign any one of the plurality of color-difference subranges stored in the color-difference-subrange storage section, to the character area determined as the chromatic region by the chromatic-region determination section; and a representative-color setup section operable to set color information about a representative color of the character area determined as the chromatic region by the chromatic-region determination section, using an average of the pixel color-difference values acquired by the color-difference-value acquisition section and included in the color-difference subrange assigned to the character area.

In the image processing apparatus of the present invention, the character-area extraction section extracts a character area from color image data. Then, the color-difference-value acquisition section acquires information about respective color-difference values of pixels in the character area, and the color-saturation-value acquisition section acquires information about respective color saturation values of the pixels in the character area. The color-difference-subrange storage section stores a plurality of color-difference subranges which are pre-defined by dividing an overall color-difference range of zero degree to 360 degree into a plurality of subranges. Then, the chromatic-region determination section determines the character area as a gray region operable, when the information about the color salutation values of the pixels in the character area acquired by the color-saturation-value acquisition section fails to satisfy a preset determination condition for determining whether a character area has a chromatic color, or determines the character area as a chromatic region, when the information about the color salutation values of the pixels in the character area satisfies the determination condition.

Based on the information about the color-difference values of the pixels in the character area determined as the chromatic region, the first color-difference-subrange assignment section assigns any one of the plurality of color-difference subranges stored in the color-difference-subrange storage section, to the character area. Then, the representative-color setup section sets color information about a representative color of the character area determined as the chromatic region, using an average of the pixel color-difference values included in the color-difference subrange assigned to the character area. In view of a general trend, it is often the case that a primary color is used as a character color. That is, the number of colors to be frequently used as character colors is small. From this point of view, the plurality of color-difference subranges can be preset to include respective ones of a plurality of color-difference values to be frequently used as character colors, and stored in the color-difference-subrange storage section. Then, based on information about respective color-difference values of pixels in each of a plurality of character areas, the first color-difference-subrange assignment section assigns any one of the plurality of color-difference ranges to each of the character areas. This makes it possible to facilitate assigning to each of the character areas one of the color-difference ranges which is close to a color of the character area.

In addition, the representative-color setup section sets color information about a representative color of each of the character areas determined as the chromatic region, using an average of the pixel color-difference values included in the color-difference subrange assigned to the character area. Thus, differently from the conventional technique configured to set a representative color of a character area using a color-difference value exhibiting a peak in a histogram, a representative color of the character area is acquired in consideration with a wider range of color-difference values in addition to that at a peak in a histogram covering a color-difference subrange with a certain width. This makes it possible to achieve enhanced color reproducibility of a color character.

Preferably, in the image processing apparatus of the present invention, the color-difference-subrange storage section pre-stores the color-difference subranges correspondingly to respective colors consisting of cyan, magenta, yellow, red, green and blue.

According to this feature, the color-difference subranges corresponding to respective colors consisting of cyan, magenta, yellow, red, green and blue which are frequently used as character colors in view of a general trend are stored in the color-difference-subrange storage section. Thus, based on information about respective color-difference values of pixels in each of a plurality of character areas, the first color-difference-subrange assignment section can assign any one of the plurality of color-difference subranges to each of the character areas. This makes it possible to increase the possibility that each of the character areas is assigned with one of the color-difference ranges which is close to a color of the character area.

Preferably, the image processing apparatus of the present invention further includes: a histogram creation section operable, based on information about the pixel color-difference values acquired by the color-difference-value acquisition section with respect to each of the character areas determined as the chromatic region by the chromatic-region determination section, to create a histogram which represents an occurrence rate of pixels relative to a color-difference value in the color-difference subrange assigned to the character area; a color-difference-subrange setup section operable, when a plurality of peaks are included in the histogram created by the histogram creation section, to set a plurality of new color-difference subranges in such a manner as to allow each of the new color-difference subranges to include a respective one of the peaks; and a second color-difference-subrange assignment section operable, based on the information about the pixel color-difference values acquired by the color-difference-value acquisition section, to re-assign any one of the plurality of new color-difference subranges set by the color-difference-subrange setup section, to the character area extracted by the character-area extraction section, wherein the representative-color setup section is operable, when the new color-difference subrange is re-assigned by the second color-difference-subrange assignment section, to set color information about a representative color of the character area determined as the chromatic region by the chromatic-region determination section, using an average of the pixel color-difference values acquired by the color-difference-value acquisition section and included in the new color-difference subrange assigned to the character area by the second color-difference-subrange assignment section.

According to this feature, with respect to each of the character areas determined as the chromatic region by the chromatic-region determination section, a histogram which represents an occurrence rate of pixels relative to a color-difference value in the color-difference subrange assigned to the character area is created based on information about the pixel color-difference values acquired by the color-difference-value acquisition section. Then, when a plurality of peaks are included in the histogram, a plurality of new color-difference subranges are created in such a manner as to allow each of the new color-difference subranges to include a respective one of the peaks. Then, based on the information about the color-difference values of the pixels in the character area, any one of the plurality of new color-difference subranges is re-assigned to the character area. Then, an average of the pixel color-difference values included in the new color-difference subrange assigned to the character area determined as the chromatic region by the chromatic-region determination section is set as color information about a representative color of the character area.

In cases where a plurality of peaks are included in a histogram covering the color-difference subrange assigned to the character area, a plurality of colors are likely to be mixed in the color-difference subrange. If the representative-color setup section sets color information about a representative color of the character area, directly using an average of the pixel color-difference values includes in the color-difference subrange assigned to the character area, a mixed color, i.e., a blend of plural colors, will be set as the representative color to cause the risk of deterioration in color reproducibility.

Thus, if a plurality of peaks are included in a histogram covering the color-difference subrange assigned to the character area, a plurality of new color-difference subranges will be set in such a manner as to allow each of the new color-difference subranges to include a respective one of the peaks, and an average of the pixel color-difference values included in the new color-difference subrange assigned to the character area will be set as color information about the representative color of the character area. This makes it possible to reduce the risk that a mixed color, i.e., a blend of plural colors, is set as a representative color of the target character area, so as to achieve color reproducibility. When a plurality of peaks are not included in a histogram covering the color-difference subrange assigned to the character area, the color-difference subranges pre-stored in the color-difference-subrange storage section are used. In this case, the color information can be set at a higher speed without the need for the processing of setting the new color-difference subranges.

Preferably, the color-difference-subrange setup section is operable to set a boundary value between adjacent ones of the new color-difference subranges, using a color difference value located at a midpoint between each of a plurality of peaks included in a histogram covering an overall color-difference range of zero degree to 360 degrees and an adjacent one of the remaining peaks.

According to this feature, a histogram covering each of the plurality of new color-difference subranges is set to include one peak while allowing the peak to be located at a center of the new color-difference subrange. Thus, color-difference values included in the color-difference subrange assigned to the character area are distributed around the peak in a balanced manner. This makes it possible to adequately obtain an average of the color-difference values so as to achieve enhanced reproducibility of the color information.

Preferably, in the image processing apparatus of the present invention, each of the pixels is expressed by three pixel values consisting of a C (cyan) pixel value, an M (magenta) pixel value and a Y (yellow) pixel value, and the color-difference-value acquisition section is operable, when a smallest one of the pixel values is the C pixel value, the M pixel value, and the Y pixel value, to calculate a color-difference value HUE of each of the pixels, according to the following formula (1), the following formula (2), and the following formula (3), respectively:

$$HUE = 60° + \frac{(Y-M) \times 60°}{|Y-M|} \tag{1}$$

$$HUE = 180° + \frac{(C-Y) \times 60°}{|C-Y|} \tag{2}$$

$$HUE = 300° + \frac{(M-C) \times 60°}{|M-C|} \tag{3}$$

According to this feature, the respective color-difference values of the pixels in the character area are calculated by a calculation processing using the formulas (1), (2) and (3). This makes it possible to simplify a processing of calculating the color-difference values.

Preferably, the image processing apparatus of the present invention, each of the pixels is expressed by three pixel values consisting of a C (cyan) pixel value, an M (magenta) pixel value and a Y (yellow) pixel value, and the color-saturation-value acquisition section is operable to calculate a color saturation value SAT of each of the pixels, according to the following formula (4):

$$SAT = \frac{(MAX(C, M, Y) - MIN(C, M, Y)) \times 360°}{MAX(C, M, Y)}, \quad (4)$$

wherein MAX (C, M, Y) represents a maximum one of the C, M and Y pixel values, and MIN (C, M, Y) represents a minimum one of the C, M and Y pixel values.

According to this feature, the respective color saturation values of the pixels in the character area are calculated by a calculation processing using the formula (4). This makes it possible to simplify a processing of calculating the color saturation values.

Preferably, the image processing apparatus of the present invention further includes: an image read section operable to read color image data from a document; a binarized-data creation section operable to binarize image data about the character area extracted by the character-area extraction section, so as to create character image data; a character compression section operable to compress the character image data created by the binarized-data creation section, so as to create compressed character image data; an image compression section operable to compress image data about the remaining area other than the character area in the color image data, to create compressed image data; a combined-data creation section operable to combine the color information of the character area set by the representative-color setup section, the compressed character image data created by the character compression section, and the compressed image data created by the image compression section, together, so as to create combined data; and a communication section operable to transmit the combined data created by the combined-data creation section, to an external terminal unit.

According to this feature, the image read section reads color image data from a document. Then, image data about a character area is extracted from the color image data, and binarized to create character image data. The binarized character image data is compressed to create compressed character image data. Image data about the remaining area other than the image data in the color image data read from the document is compressed to create compressed image data. Then, the color information of the character area, the compressed character image data and the compressed image data are combined together to create combined data. This makes it possible to facilitate reduction in size of the combined data based on an increase in data compression ratio while minimizing deterioration in image quality of the character area, and facilitate reduction in communication load during transmission of the combined data to the external terminal unit.

According to another aspect of the present invention, there is provided a computer-readable recording medium which records an image processing program for causing a computer to function as: a character-area extraction section operable to extract a character area from color image data; a color-difference-value acquisition section operable to acquire information about respective color-difference values of pixels in the character area extracted by the character-area extraction section; a color-saturation-value acquisition section operable to acquire information about respective color saturation values of the pixels in the character area extracted by the character-area extraction section; a color-difference-subrange storage section which stores a plurality of color-difference subranges pre-defined by dividing an overall color-difference range of zero degree to 360 degree into a plurality of subranges; a chromatic-region determination section operable, when the information about the color salutation values of the pixels in the character area acquired by the color-saturation-value acquisition section fails to satisfy a preset determination condition for determining whether a character area has a chromatic color, to determine the character area as a gray region, and, when the information about the color salutation values of the pixels in the character area satisfies the determination condition, to determine the character area as a chromatic region; a first color-difference-subrange assignment section operable, based on the information about the pixel color-difference values acquired by the color-difference-value acquisition section, to assign any one of the plurality of color-difference subranges stored in the color-difference-subrange storage section, to the character area determined as the chromatic region by the chromatic-region determination section; and a representative-color setup section operable to set color information about a representative color of the character area determined as the chromatic region by the chromatic-region determination section, using an average of the pixel color-difference values acquired by the color-difference-value acquisition section and included in the color-difference subrange assigned to the character area.

In the computer-readable recording medium of the present invention, an average of the pixel color-difference values included in the color-difference subrange assigned to the character area determined as the chromatic region is set as color information about a representative color of the character area. Thus, differently from the conventional technique configured to set a representative color of a character area using a color-difference value exhibiting a peak in a histogram, a representative color of a character area is acquired in consideration with a wider range of color-difference values in addition to that at a peak in a histogram covering a color-difference subrange with a certain width. This makes it possible to achieve enhanced color reproducibility of a color character.

This application is based on Japanese Patent application serial No. 2007-071203 filed in Japan Patent Office on Mar. 19, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing apparatus comprising:
a character-area extraction section operable to extract a character area from color image data;
a color-difference-value acquisition section operable to acquire information about respective color-difference values of pixels in the character area extracted by said character-area extraction section;
a color-saturation-value acquisition section operable to acquire information about respective color saturation values of the pixels in the character area extracted by said character-area extraction section;
a color-difference-subrange storage section which stores a plurality of color-difference subranges pre-defined by dividing an overall color-difference range of zero degree to 360 degree into a plurality of subranges;

a chromatic-region determination section operable, when the information about the color salutation values of the pixels in the character area acquired by said color-saturation-value acquisition section fails to satisfy a preset determination condition for determining whether a character area has a chromatic color, to determine said character area as a gray region, and, when the information about the color salutation values of the pixels in said character area satisfies said determination condition, to determine said character area as a chromatic region;

a first color-difference-subrange assignment section operable, based on the information about the pixel color-difference values acquired by said color-difference-value acquisition section, to assign any one of the plurality of color-difference subranges stored in said color-difference-subrange storage section, to the character area determined as the chromatic region by said chromatic-region determination section; and a representative-color setup section operable to set color information about a representative color of the character area determined as the chromatic region by said chromatic-region determination section, using an average of the pixel color-difference values acquired by said color-difference-value acquisition section and included in the color-difference subrange assigned to said character area.

2. The image processing apparatus as defined in claim 1, wherein said color-difference-subrange storage section pre-stores said color-difference subranges correspondingly to respective colors consisting of cyan, magenta, yellow, red, green and blue.

3. The image processing apparatus as defined in claim 1, which further includes:

a histogram creation section operable, based on information about the pixel color-difference values acquired by said color-difference-value acquisition section with respect to each of the character areas determined as the chromatic region by said chromatic-region determination section, to create a histogram which represents an occurrence rate of pixels relative to a color-difference value in the color-difference subrange assigned to said character area;

a color-difference-subrange setup section operable, when a plurality of peaks are included in the histogram created by said histogram creation section, to set a plurality of new color-difference subranges in such a manner as to allow each of the new color-difference subranges to include a respective one of said peaks; and a second color-difference-subrange assignment section operable, based on the information about the pixel color-difference values acquired by said color-difference-value acquisition section, to re-assign any one of the plurality of new color-difference subranges set by said color-difference-subrange setup section, to the character area extracted by said character-area extraction section, wherein said representative-color setup section is operable, when the new color-difference subrange is re-assigned by said second color-difference-subrange assignment section, to set color information about a representative color of the character area determined as the chromatic region by said chromatic-region determination section, using an average of the pixel color-difference values acquired by said color-difference-value acquisition section and included in the new color-difference subrange assigned to said character area by said second color-difference-subrange assignment section.

4. The image processing apparatus as defined in claim 3, wherein said color-difference-subrange setup section is operable to set a boundary value between adjacent ones of the new color-difference subranges, using a color difference value located at a midpoint between each of a plurality of peaks included in a histogram covering an overall color-difference range of zero degree to 360 degrees and an adjacent one of the remaining peaks.

5. The image processing apparatus as defined in claim 1, wherein:

each of said pixels is expressed by three pixel values consisting of a C (cyan) pixel value, an M (magenta) pixel value and a Y (yellow) pixel value; and said color-difference-value acquisition section is operable, when a smallest one of said pixel values is the C pixel value, the M pixel value, and the Y pixel value, to calculate a color-difference value HUE of each of said pixels, according to the following formula (1), the following formula (2), and the following formula (3), respectively:

$$HUE = 60° + \frac{(Y-M) \times 60°}{|Y-M|} \quad (1)$$

$$HUE = 180° + \frac{(C-Y) \times 60°}{|C-Y|} \quad (2)$$

$$HUE = 300° + \frac{(M-C) \times 60°}{|M-C|}. \quad (3)$$

6. The image processing apparatus as defined in claim 1, wherein:

each of said pixels is expressed by three pixel values consisting of a C (cyan) pixel value, an M (magenta) pixel value and a Y (yellow) pixel value; and said color-saturation-value acquisition section is operable to calculate a color saturation value SAT of each of the pixels, according to the following formula (4):

$$SAT = \frac{(\text{MAX}(C, M, Y) - \text{MIN}(C, M, Y)) \times 360°}{\text{MAX}(C, M, Y)}, \quad (4)$$

wherein MAX (C, M, Y) represents a maximum one of the C, M and Y pixel values, and MIN (C, M, Y) represents a minimum one of the C, M and Y pixel values.

7. The image processing apparatus as defined in claim 1, which further includes:

an image read section operable to read color image data from a document;

a binarized-data creation section operable to binarize image data about the character area extracted by said character-area extraction section, so as to create character image data;

a character compression section operable to compress the character image data created by said binarized-data creation section, so as to create compressed character image data;

an image compression section operable to compress image data about the remaining area other than said character area in said color image data, to create compressed image data;

a combined-data creation section operable to combine the color information of the character area set by said representative-color setup section, the compressed character image data created by said character compression section, and the compressed image data created by said image compression section, together, so as to create combined data; and a communication section operable to transmit the combined data created by said combined-data creation section, to an external terminal unit.

8. A computer-readable recording medium which records an image processing program for causing a computer to function as:

a character-area extraction section operable to extract a character area from color image data;

a color-difference-value acquisition section operable to acquire information about respective color-difference values of pixels in the character area extracted by said character-area extraction section;

a color-saturation-value acquisition section operable to acquire information about respective color saturation values of the pixels in the character area extracted by said character-area extraction section;

a color-difference-subrange storage section which stores a plurality of color-difference subranges pre-defined by dividing an overall color-difference range of zero degree to 360 degree into a plurality of subranges;

a chromatic-region determination section operable, when the information about the color salutation values of the pixels in the character area acquired by said color-saturation-value acquisition section fails to satisfy a preset determination condition for determining whether a character area has a chromatic color, to determine said character area as a gray region, and, when the information about the color salutation values of the pixels in said character area satisfies said determination condition, to determine said character area as a chromatic region;

a first color-difference-subrange assignment section operable, based on the information about the pixel color-difference values acquired by said color-difference-value acquisition section, to assign any one of the plurality of color-difference subranges stored in said color-difference-subrange storage section, to the character area determined as the chromatic region by said chromatic-region determination section; and a representative-color setup section operable to set color information about a representative color of the character area determined as the chromatic region by said chromatic-region determination section, using an average of the pixel color-difference values acquired by said color-difference-value acquisition section and included in the color-difference subrange assigned to said character area.

* * * * *